(12) United States Patent
Wagnitz et al.

(10) Patent No.: US 10,981,432 B2
(45) Date of Patent: Apr. 20, 2021

(54) HVAC CASE

(71) Applicant: DENSO International America, Inc., Southfield, MI (US)

(72) Inventors: Jason Wagnitz, Farmington Hills, MI (US); Michael Polus, Belleville, MI (US)

(73) Assignee: DENSO International America, Inc., Southfield, MI (US)

( * ) Notice: Subject to any disclaimer, the term of this patent is extended or adjusted under 35 U.S.C. 154(b) by 236 days.

(21) Appl. No.: 16/030,015

(22) Filed: Jul. 9, 2018

(65) Prior Publication Data

US 2020/0009938 A1 Jan. 9, 2020

(51) Int. Cl.
B60H 1/00 (2006.01)

(52) U.S. Cl.
CPC ..... B60H 1/00514 (2013.01); B60H 1/00542 (2013.01); *B60H 2001/002* (2013.01)

(58) Field of Classification Search
CPC ............ B60H 1/00064; B60H 1/00514; B60H 1/00521; B60H 1/00542; B60H 1/00678; B60H 2001/002; B60H 2001/00714; F24F 13/0272; F24F 2221/36
See application file for complete search history.

(56) References Cited

U.S. PATENT DOCUMENTS

| | | | | |
|---|---|---|---|---|
| 4,289,195 A * | 9/1981 | Bellot | ................ | B60H 1/00064 165/204 |
| 5,016,704 A * | 5/1991 | Ono | ................... | B60H 1/00064 165/137 |
| 5,042,566 A * | 8/1991 | Hildebrand | ........ | B60H 1/00678 165/204 |
| 6,230,795 B1 * | 5/2001 | Tsunooka | ........... | B60H 1/00064 165/203 |
| 6,247,530 B1 * | 6/2001 | Mochizuki | ......... | B60H 1/00064 165/203 |
| 7,156,166 B2 * | 1/2007 | Bendell | .............. | B60H 1/00028 165/203 |
| 7,748,441 B2 * | 7/2010 | Litwing | ............. | B60H 1/00521 165/204 |
| 2004/0016536 A1 * | 1/2004 | Auer | ................... | B60H 1/00064 165/203 |
| 2006/0099903 A1 * | 5/2006 | Bowler | ............. | B60H 1/00678 454/121 |
| 2006/0151161 A1 * | 7/2006 | Richter | ............. | B60H 1/00542 165/203 |
| 2016/0046171 A1 * | 2/2016 | Xia | .................... | B60H 1/00064 165/203 |
| 2018/0141404 A1 * | 5/2018 | Yeon | .................. | B60H 1/00064 |
| 2018/0194192 A1 * | 7/2018 | Pierres | ............... | B60H 1/00064 |

* cited by examiner

*Primary Examiner* — Eric S Ruppert
*Assistant Examiner* — Hans R Weiland
(74) *Attorney, Agent, or Firm* — Harness, Dickey & Pierce, P.L.C.

(57) ABSTRACT

An HVAC case having an airflow junction. A mount is at the airflow junction and is configured to individually mount a door and an airflow blocker at the airflow junction. The door is mounted at the mount of the airflow junction to configure the HVAC case for use with HVAC systems configured for airflow through the airflow junction. The airflow blocker is mounted at the mount of the airflow junction to configure the HVAC case for use with HVAC systems not configured for airflow through the airflow junction.

11 Claims, 3 Drawing Sheets

HVAC CASE

FIELD

The present disclosure relates to a heating, ventilation, and air conditioning (HVAC) case.

BACKGROUND

This section provides background information related to the present disclosure, which is not necessarily prior art.

Current vehicle heating, ventilation, and air conditioning (HVAC) cases are suitable for their intended use, but are subject to improvement. For example, some vehicle HVAC systems provide dedicated airflow to a rear of the vehicle, while other HVAC systems do not. HVAC systems that provide dedicated airflow to the rear, and HVAC systems that do not provide dedicated airflow to the rear, currently require different types of HVAC cases. There is not an existing HVAC case that can be effectively used with HVAC systems that provide dedicated airflow to the rear of the vehicle, and with HVAC systems that do not provide dedicated airflow to the rear of the vehicle. It would therefore be desirable to have a single HVAC case design that can be used in applications that provide dedicated airflow to the rear of the vehicle, as well as applications that do not provide dedicated airflow to the rear of the vehicle. The present disclosure advantageously addresses this need in the art, as well as numerous others as described in detail herein.

SUMMARY

This section provides a general summary of the disclosure, and is not a comprehensive disclosure of its full scope or all of its features.

The present disclosure includes an HVAC case having an airflow junction. A mount is at the airflow junction and is configured to individually mount a door and an airflow blocker at the airflow junction. The door is mounted at the mount of the airflow junction to configure the HVAC case for use with HVAC systems configured for airflow through the airflow junction. The airflow blocker is mounted at the mount of the airflow junction to configure the HVAC case for use with HVAC systems not configured for airflow through the airflow junction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
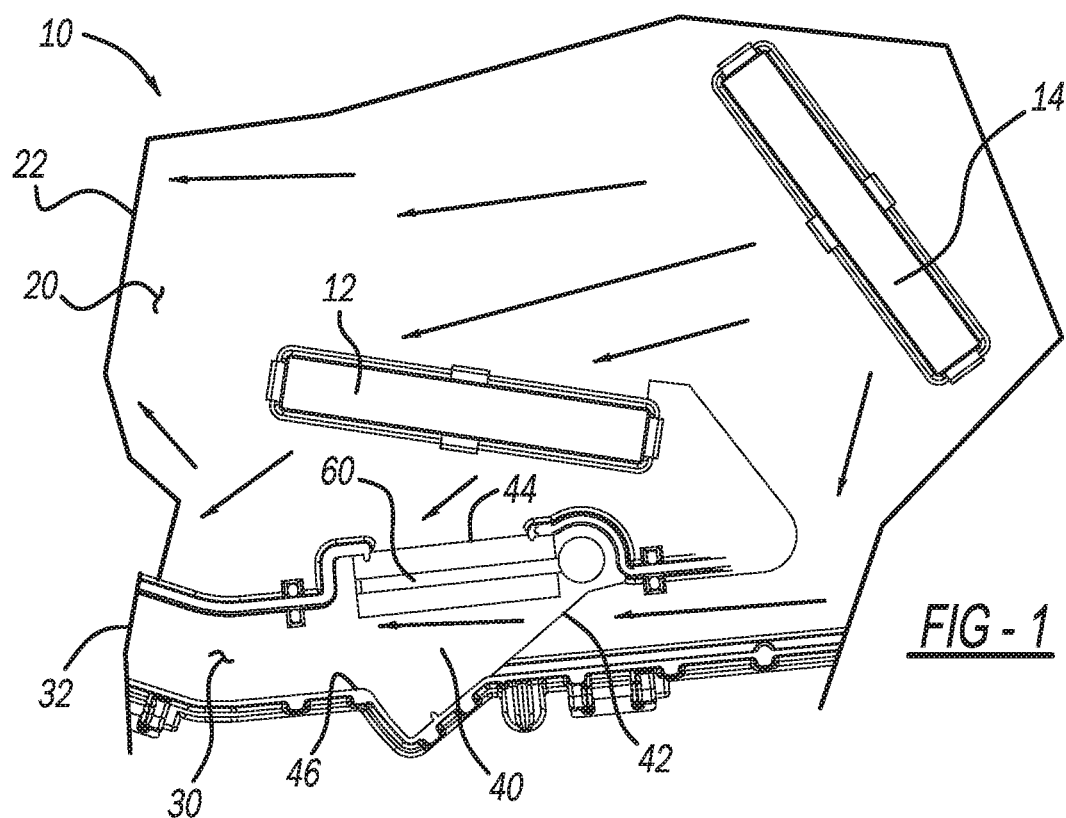
FIG. 1 illustrates an HVAC case in accordance with the present disclosure, the HVAC case including an airflow junction configured to interchangeably accommodate a door (as illustrated) and an airflow blocker (see FIG. 4)

With initial reference to FIG. 1, a heating, ventilation, and air conditioning (HVAC) case in accordance with the present disclosure is illustrated at reference numeral 10. The HVAC case 10 can be configured for use in any suitable application, such as any suitable vehicular application. Examples of suitable vehicles that the HVAC case may be used with include the following: passenger vehicles, mass transit vehicles, recreational vehicles, military vehicles/equipment, construction vehicles/equipment, watercraft, aircraft, etc. The HVAC case 10 may also be configured for use with non-vehicular HVAC systems, such as building HVAC systems.

The HVAC case 10 includes a heater core 12 and an evaporator 14, which respectively heat and cool airflow passing through the HVAC case 10. The HVAC case 10 may include any suitable doors, passageways, or other features suitable for directing airflow to or around the heater core 12 and evaporator 14, such that airflow exiting the HVAC case 10 is of a desired temperature. The HVAC case 10 defines a front airflow path 20, which directs airflow to a front airflow outlet 22. The HVAC case 10 further defines a rear airflow path 30, which directs airflow to a rear airflow outlet 32. With respect to vehicular applications, airflow exiting the front airflow outlet 22 is directed to passenger cabin outlets at a front of the vehicle. Airflow exiting the rear airflow outlet 32 is directed to airflow outlets arranged more towards a rear of the passenger cabin to direct airflow to passengers seated in the back of the vehicle.

The HVAC case 10 further includes an airflow junction 40, which is at an opening of the rear airflow path 30. The airflow junction 40 includes a first inlet 42, a second inlet 44, and an outlet 46. The first inlet 42 is arranged such that airflow that has passed through the evaporator 14, but not through the heater core 12, flows to the first inlet 42. The second inlet 44 is arranged such that airflow heated by the heater core 12 flows to the second inlet 44.

In the configuration of FIG. 1, the airflow junction 40 is outfitted with a door 60, which is movable to control the amount of cold airflow flowing into the junction 40 through the first inlet 42, and the amount of warm airflow flowing into the junction 40 through the second inlet 44. The airflow entering through the first inlet 42 and the second inlet 44 mixes at the airflow junction 40, exits the airflow junction 40 through the outlet 46, and flows through the rear airflow path 30 to the rear airflow outlet 32. The door 60 can also be positioned to completely close the first inlet 42 or the second inlet 44. Thus by pivoting the door 60, the temperature of the airflow flowing through the rear airflow outlet 32 to the passengers at the rear of the vehicle can be controlled.

Figure 2:
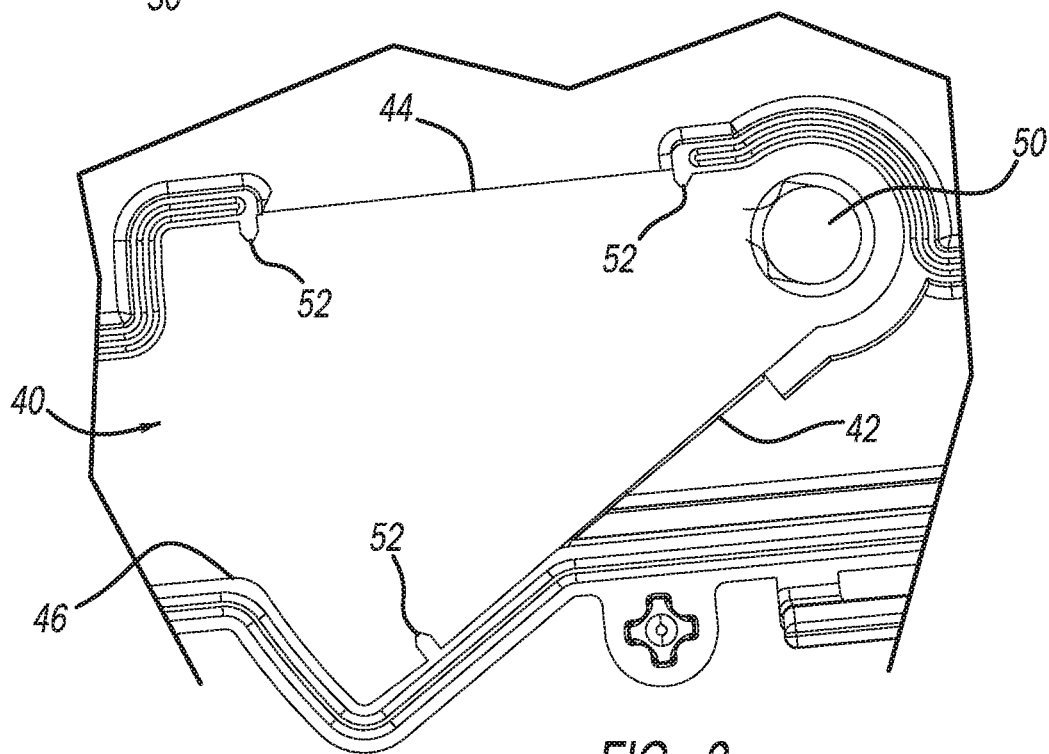
FIG. 2 illustrates an airflow junction of the HVAC case of FIG. 1.
Figure 3:
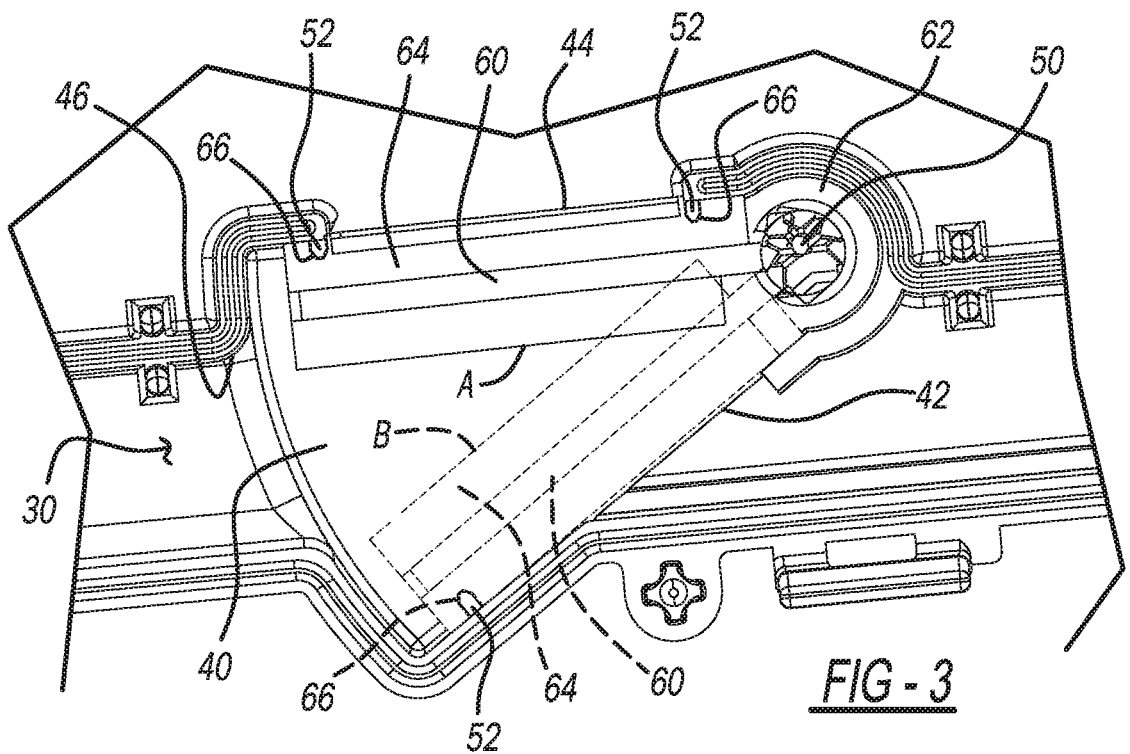
FIG. 3 illustrates the door arranged at the airflow junction.

With continued reference to FIG. 1 and additional reference to FIGS. 2 and 3, the airflow junction 40 further includes a bearing 50 and a plurality of ribs 52. The bearing 50 may be any mount suitable for cooperating with a base 62 of the door 60 as illustrated in FIG. 3, to permit rotation of a body 64 of the door 60 from position A to position B, or any point therebetween. The ribs 52 may be any suitable interlocking ribs for interlocking with the door 60. For example, the ribs 52 may be triangular shaped. When the door 60 is at position A, the body 64 blocks the second inlet 44 to prevent airflow warmed by the heater core 12 from flowing to the rear airflow path 30. At position A, one or more of the ribs 52 are seated within receptacles 66 defined by the body 64 of the door 60 to provide a generally airtight seal. When the door 60 is at position B, the first inlet 42 is closed to prevent airflow cooled by the evaporator 14 from flowing to the rear airflow path 30. At position B, another rib 52 is received within another receptacle 66 of the body 64 to provide a generally airtight seal. The body 64 can be arranged at any intermediate position between positions A and B to permit airflow of any suitable intermediate temperature (warm/cold mixture) to pass through the outlet 46 and to the rear airflow path 30.

Although the airflow junction 40 is illustrated as arranged at the rear airflow path 30, the airflow junction 40 may be arranged at any other airflow path to control a mixture of airflow therethrough, or restrict the flow of air. For example, the airflow junction 40 can be arranged at any HVAC door location with at least one inlet and at least one outlet. The junction 40 may be placed at a rear mode control door, at a junction between face and foot HVAC outlets, and at a junction between hot and cold inlets and defrost and face outlets, for example.

Figure 4:
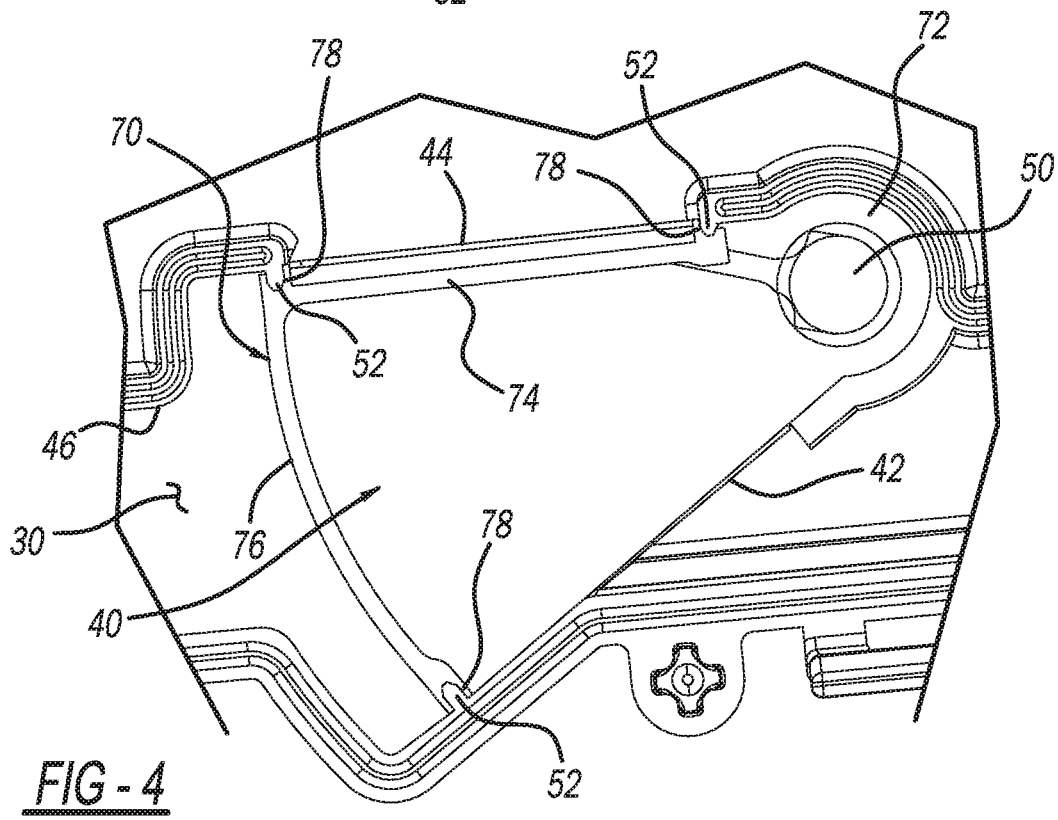
FIG. 4 illustrates the airflow blocker arranged at the airflow junction.

The HVAC case 10 may also be used in vehicles that do not provide for dedicated airflow outlets for a rear of the vehicle. In such applications, the rear airflow path 30 and the rear airflow outlet 32 will not be used. Advantageously, the HVAC case 10 may still be used with such applications because the door 60 may be replaced by an airflow blocker 70, as illustrated in FIG. 4. FIG. 4 illustrates the airflow junction 40 of the HVAC case 10 with the door 60 removed, and the airflow blocker 70 arranged in its place.

Figure 5:
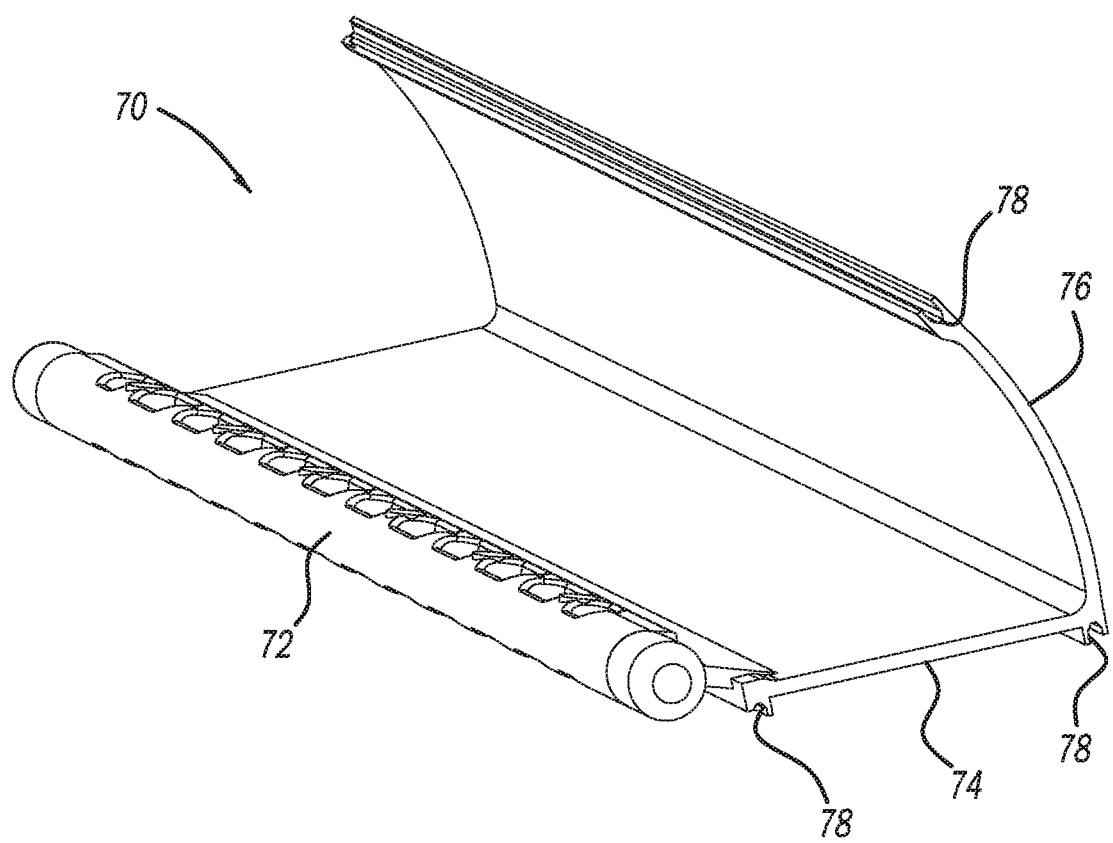
FIG. 5 is a perspective view of the airflow blocker.

With reference to FIGS. 4 and 5, the airflow blocker 70 includes a base 72, an inlet blocking member 74, and an outlet blocking member 76. The base 72 couples with the bearing 50 in any suitable manner. The inlet blocking member 74 extends along the second inlet 44 to block airflow from flowing through the second inlet 44. The outlet blocking member 76 extends across the outlet 46 to restrict airflow from flowing through the outlet 46. The airflow blocker 70 may in some applications also include another blocking member arranged across the first inlet 42 to block airflow from flowing through the first inlet 42. The airflow blocker 70 further includes receptacles 78, which are sized, shaped, and positioned to cooperate with the ribs 52 to further secure the airflow blocker 70 in the position at FIG. 4, and provide generally airtight seals across the second inlet 44 and the outlet 46.

The airflow blocker 70 thus advantageously allows the HVAC case 10 to be used in a plurality of different applications, such as HVAC systems that provide dedicated airflow to a rear of a passenger cabin, as well as vehicular HVAC systems that do not provide dedicated airflow to a rear of the passenger cabin. The HVAC case 10 eliminates any need to design, manufacture, stock, sell, distribute, etc. separate HVAC cases for HVAC systems that provide dedicated airflow to the rear of the passenger cabin and those HVAC systems that do not.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) case comprising:

an evaporator and a heater core;

an airflow junction defining a first inlet arranged to receive airflow that has passed across the evaporator but not the heater core, defining a second inlet facing the heater core to receive airflow that has passed across the heater core, defining an outlet to a rear airflow path, and including a bearing between the first inlet and the second inlet, the bearing configured to mount a door movable between the first inlet and the second inlet;

one of the door and an airflow blocker mounted at the airflow junction, the airflow blocker configured to block airflow through the airflow junction to the rear airflow path, the airflow blocker including a base configured to couple with the bearing of the HVAC case, an inlet blocking member extending from the base, and an outlet blocking member extending from the inlet blocking member at an angle such that the blocking member is generally L-shaped; and an airflow deflector extending from the heater core to the airflow junction;

wherein the door is mounted to the bearing of the airflow junction and movable to selectively permit airflow through one of the first inlet and the second inlet to configure the HVAC case for use with HVAC systems configured for airflow through the airflow junction to the rear airflow path; and wherein the airflow blocker is mounted at the airflow junction to block airflow through the airflow junction to the rear airflow path and configure the HVAC case for use with HVAC systems not configured for airflow through the airflow junction.

2. The HVAC case of claim 1, wherein the door is movable to a first position to block airflow heated by the heater core from flowing through the airflow junction;

wherein the door is movable to a second position to block airflow cooled by the evaporator and not heated by the heater core from flowing through the airflow junction; and wherein the door is movable to an intermediate position between the first position and the second position to permit airflow through the airflow junction from both the heater core and the evaporator.

3. The HVAC case of claim 1, wherein the airflow junction includes ribs and the door includes recesses configured to receive the ribs to provide an interlocking relationship between the door and the ribs.

4. The HVAC case of claim 3, wherein the interlocking relationship is a tongue and groove interlocking relationship.

5. The HVAC case of claim 1, wherein the outlet blocking member of the airflow blocker restricts airflow through the outlet of the airflow junction when the airflow blocker is mounted at the airflow junction.

6. The HVAC case of claim 1, wherein the airflow blocker includes receptacles configured to receive ribs at the airflow junction to secure the airflow blocker at the airflow junction.

7. A heating, ventilation, and air conditioning (HVAC) case for conditioning air of a passenger cabin comprising:

at least one of a heater core and an evaporator;

a front airflow outlet for directing airflow to passenger cabin outlets at a front of the passenger cabin;

a rear airflow outlet for directing airflow to passenger cabin outlets at a rear of the passenger cabin;

an airflow junction at an entrance to the rear airflow outlet, the airflow junction defining a first inlet arranged to receive airflow that has passed across the evaporator but not the heater core, defining a second inlet facing the heater core to receive airflow that has passed across the heater core, defining an outlet to a rear airflow path leading to the rear airflow outlet, and including a bearing between the first inlet and the second inlet, the bearing configured to mount a door movable between the first inlet and the second inlet;

one of the door and an airflow blocker mounted at the airflow junction, the airflow blocker configured to block airflow through the airflow junction to the rear airflow path, the airflow blocker including a base configured to couple with the bearing of the HVAC case, an inlet blocking member extending from the base, and an outlet blocking member extending from the inlet blocking member at an angle such that the blocking member is generally L-shaped; and an airflow deflector extending from the heater core to the airflow junction;

wherein the door is mounted to the bearing of the airflow junction and movable to selectively permit airflow through one of the first inlet and the second inlet to configure the HVAC case for use with HVAC systems configured for airflow through the rear airflow outlet; and wherein the airflow blocker is mounted at the airflow junction to block airflow through the airflow junction to the rear airflow path and configure the HVAC case for use with HVAC systems not configured for airflow through the rear airflow outlet.

8. The HVAC case of claim 7, wherein the door is movable to a first position to block airflow heated by the heater core from flowing through the rear airflow outlet;

wherein the door is movable to a second position to block airflow cooled by the evaporator and not heated by the heater core from flowing through the rear airflow outlet; and wherein the door is movable to an intermediate position between the first position and the second position to permit airflow to the airflow junction from both the heater core and the evaporator.

9. The HVAC case of claim 7, wherein the airflow junction includes ribs and the door includes recesses configured to receive the ribs to provide an interlocking relationship between the door and the ribs.

10. The HVAC case of claim 7, wherein the outlet blocking member of the airflow blocker restricts airflow through the rear airflow outlet when the airflow blocker is mounted at the airflow junction.

11. The HVAC case of claim 10, wherein the airflow blocker includes receptacles configured to receive ribs at the airflow junction to secure the airflow blocker at the airflow junction.

* * * * *